United States Patent
Kang et al.

(10) Patent No.: US 7,470,485 B2
(45) Date of Patent: Dec. 30, 2008

(54) SPACER FOR PRODUCTION OF BATTERY PACK

(75) Inventors: Dongha Kang, Seoul (KR); Joonyoung Shin, Incheon (KR)

(73) Assignee: LG Chem, Ltd. (KR)

( * ) Notice: Subject to any disclaimer, the term of this patent is extended or adjusted under 35 U.S.C. 154(b) by 13 days.

(21) Appl. No.: 11/624,353

(22) Filed: Jan. 18, 2007

(65) Prior Publication Data
US 2007/0190405 A1    Aug. 16, 2007

(30) Foreign Application Priority Data
Feb. 13, 2006    (KR) .................. 10-2006-0013643

(51) Int. Cl.
*H01M 2/10*   (2006.01)
*H01M 6/42*   (2006.01)
*H01M 2/02*   (2006.01)

(52) U.S. Cl. .................. 429/99; 429/96; 429/100; 429/149; 429/164

(58) Field of Classification Search .................. 429/99, 429/96
See application file for complete search history.

(56) References Cited

U.S. PATENT DOCUMENTS 6,465,123 B1 * 10/2002 Baumann et al. .............. 429/99

FOREIGN PATENT DOCUMENTS

JP    2001100401 A   *   4/2001

* cited by examiner

*Primary Examiner*—Dah-Wei Yuan
*Assistant Examiner*—Zachary Best
(74) *Attorney, Agent, or Firm*—Cantor Colburn LLP

(57) ABSTRACT

A spacer for production of a battery pack using cylindrical batteries as unit cells, wherein the spacer is constructed in the form of a rectangular frame, the spacer is provided at opposite side surfaces (opposite faces) of the rectangular frame with a plurality of battery receiving parts having a circumference-type inner surface structure that partially covers the outer surfaces of the cylindrical batteries, each battery receiving part has a horizontal through-hole, which extends between the opposite side surfaces of the frame, and a pair of battery receiving parts (a unit receiving part) formed at the opposite side surfaces of the frame is connected with another adjacent unit receiving part via structures that can be easily cut.

8 Claims, 4 Drawing Sheets

SPACER FOR PRODUCTION OF BATTERY PACK

FIELD OF THE INVENTION

The present invention relates to a spacer for battery pack production, and, more particularly, to a spacer for production of a battery pack using cylindrical batteries as unit cells, wherein the spacer is constructed in the form of a rectangular frame, the spacer is provided at opposite side surfaces (opposite faces) of the rectangular frame with a plurality of battery receiving parts having a circumference-type inner surface structure that partially covers the outer surfaces of the cylindrical batteries, each battery receiving part has a horizontal through-hole, which extends between the opposite side surfaces of the frame, and a pair of battery receiving parts (a unit receiving part) formed at the opposite side surfaces of the frame is connected with another adjacent unit receiving part via structures that can be easily cut.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and high discharge voltage, on which much research has been carried out and which is now commercially and widely used.

Depending upon kinds of external devices in which the secondary batteries are used, the secondary batteries may be used in the form of a single battery or in the form of a battery pack having a plurality of unit cells electrically connected with each other. For example, small-sized devices, such as mobile phones, can be operated for a predetermined period of time with the output and the capacity of one battery. On the other hand, a battery pack needs to be used in medium- or large-sized devices, such as laptop computers, electric vehicles, and hybrid electric vehicles, because high output and large capacity are necessary for the medium- or large-sized devices.

The battery pack is a battery structure in which a plurality of unit cells are electrically connected in series and/or in parallel with each other. It is very important for the battery pack to maintain the stable arrangement structure of the unit cells such that the unit cells can be sequentially connected with each other.

Especially, cylindrical secondary batteries, which are used as the unit cells of the battery pack, have great difficulty in maintaining the arrangement structure due to the appearance characteristics thereof. For this reason, the use of additional fixing members is necessary for the cylindrical secondary batteries. For example, there has been normally used a method of arranging cylindrical secondary batteries and fixing the cylindrical secondary batteries with fixing tape or coating cylindrical secondary batteries with plastic so as to maintain the arrangement structure of the cylindrical secondary batteries. According to circumstances, double-sided adhesive tape may be attached between the unit cells so as to further increase the coupling force between the unit cells.

However, the strength of the fixing tape and the plastic coating is small, and therefore, the possibility is very high that the fixing tape and the plastic coating are damaged or broken. Consequently, the fixing tape and the plastic coating are not suitable for stably maintaining the arrangement structure of the unit cells. In addition, when the battery pack is constructed using the fixing tape or the double-sided adhesive tape, a process for detaching and attaching the fixing tape or the double-sided adhesive tape is complicated and troublesome, which is a factor to increase the time necessary for constructing the battery pack.

Furthermore, it is required that the battery pack have various outputs and capacities by adjusting the number of the unit cells connected with each other depending upon the specification of a device in which the battery pack is used. In the cylindrical unit cells, however, a fixing member for maintaining the arrangement structure of the cylindrical unit cells is requisite. Consequently, there is a problem that various kinds of fixing members must be manufactured depending upon the number of unit cells to be assembled when the battery pack is constructed with the cylindrical unit cells. In order to solve this problem, a unit fixing member may be manufactured such that one or more unit cells can mounted to the unit fixing member, and a plurality of unit fixing members may be connected with each other to construct a battery pack. In this case, however, it is necessary that the unit fixing members be coupled with each other depending upon desired output and capacity of the battery pack.

Consequently, the necessity of a technology for fundamentally solving the above-mentioned problem is very high.

SUMMARY OF THE INVENTION

Therefore, the present invention has been made to solve the above problems, and other technical problems that have yet to be resolved.

Specifically, it is an object of the present invention to provide a spacer for battery pack production that is capable of allowing the production of a structurally stable battery pack using the minimized number of parts and that is capable of preventing the occurrence of short circuits between unit cells, which may be caused during the assembly or the use of the battery pack.

It is another object of the present invention to provide a spacer for battery pack production that can be cut into various appropriate sizes, as occasion demands, so as to easily adjust the capacity and output of a battery pack and that can effectively remove heat generated from unit cells during the charge and discharge of the unit cells.

It is yet another object of the present invention to provide a battery pack including the above-described spacer.

In accordance with one aspect of the present invention, the above and other objects can be accomplished by the provision of a spacer for production of a battery pack using cylindrical batteries as unit cells, wherein the spacer is constructed in the form of a rectangular frame, the spacer is provided at opposite side surfaces (opposite faces) of the rectangular frame with a plurality of battery receiving parts having a circumference-type inner surface structure that partially covers the outer surfaces of the cylindrical batteries, each battery receiving part has a horizontal through-hole, which extends between the opposite side surfaces of the frame, and a pair of battery receiving parts (a unit receiving part) formed at the opposite side surfaces of the frame is connected with another adjacent unit receiving part via structures that can be easily cut.

Preferably, the battery receiving parts are provided at the upper and lower ends thereof with skirts to partially cover the upper and lower end surfaces of the unit cells such that the unit cells can be stably fixed. Specifically, the skirts protrude in a structure corresponding to the shape of the outer circumferential surfaces of the upper and lower ends of the unit cells when unit cells are received in the battery receiving parts.

The outer circumferential surfaces of the upper and lower ends of the unit cells mean the circular upper and lower end surfaces of the cylindrical unit cells. The skirts protrude along the outer circumferential surfaces of the circumferential type battery receiving parts, preferably, in a U shape (a horseshoe shape) such that the circular upper and lower end surfaces of the cylindrical unit cells can be partially covered by the skirts. When the U-shaped skirts are used, it is possible to stably fix the unit cells, and electrode terminals formed at the upper and lower end surfaces of the unit cells are not covered. Consequently, it is possible to easily perform the electrical connection between the unit cells when constructing the battery pack.

Also, the skirts protrude to fix the unit cells as described above. Consequently, the protrusion of the skirts is not particularly restricted so long as the skirts can stably fix the unit cells.

The battery receiving parts are formed in a structure to partially cover the outer surfaces of the unit cells to not more than 50%, preferably 20 to 40%, of the height of the unit cells. Here, the "height of the unit cells" means the diameter of the unit cells at the section of the unit cells when the unit cells are cut perpendicular to the longitudinal direction of the unit cells. In this structure, the battery receiving parts serve to stably fix the cylindrical unit cells together with the skirts. Specifically, the skirts prevent the movement of the unit cells in the longitudinal direction of the unit cells so as to fix the unit cells, and the battery receiving parts prevent the movement of the unit cells from side to side due to the structural characteristics of the cylindrical unit cells so as to fix the unit cells.

In a preferred example, the horizontal through-hole may be formed through the frame at the opposite-side middle parts of each battery receiving part such that the horizontal through-hole extends perpendicular to the longitudinal direction of the unit cells. The horizontal through-hole may be continuously formed at every connection region of two adjacent battery receiving parts on the same plane of the frame. In this structure, the adjacent battery receiving parts are separated from each other at the middle parts thereof, and the adjacent battery receiving parts are connected with each other only at the upper and lower end sides of the horizontal through-hole. Consequently, when a plurality of unit cells are connected with each other using the spacer with the above-stated construction according to the present invention, it is possible to effectively remove heat generated from the unit cells during the charge and discharge of the unit cells or during the operation of the unit cells.

In the specification, as defined above, the two battery receiving parts adjacent to each other at the opposite side surfaces of the frame may be expressed by a unit receiving part. One of principal characteristics of the present invention is that it is easy to divide the unit receiving parts as occasion demands. Specifically, the unit receiving parts are connected with each other in a structure that can be easily cut.

Consequently, the connection regions of the unit receiving parts are not particularly restricted so long as the connection regions of the unit receiving parts are constructed in a structure that can be easily cut. In other words, various connection structures are possible. For example, the connection regions of the unit receiving parts may be constructed in a gate structure having small width and small thickness. More specifically, as in the above-described preferred example, when the horizontal through-hole is formed through the frame at the opposite-side middle parts of each battery receiving part, the respective unit receiving parts can be interconnected with each other by the gate structures having small width and small thickness at the upper and lower ends of the horizontal through-hole.

In a preferred example, the spacer may have a vertical through-channel formed in the intersection region of four adjacent battery receiving parts on the same and opposite planes of the frame. The vertical through-channel may be regarded as a vacant space formed between four circles when the four circles are arranged such that centers of the circles are positioned at respective corners of an imaginary square and the circumference of each circle touches the circumferences of the circles positioned at neighboring corners of the square. Consequently, the vertical through-channel is formed in the center of the upper end surface of the spacer along the battery receiving parts. The vertical through-channel is formed in the shape of a rhombus comprising four curved surfaces. The size and the number of the vertical through-channels are decided depending upon the size and the number of the unit cells to be used.

In the spacer with the above-stated construction, at least one thermistor may be mounted in the vertical through-channel for measuring the temperature of the unit cells. Preferably, the vertical through-channel communicates with the horizontal through-hole. In this structure, it is preferable to locate the thermistor in the region where the vertical through-channel and the horizontal through-hole communicate with each other, whereby the mounting of the thermistor is easily accomplished, and the effect obtained by the provision of the thermistor is maximized.

Preferably, the spacer according to the present invention is made of a plastic material, such as polycarbonate (PC) or polyacrylonitrile-butadiene-styrene (ABS), which has high electrical insulation, is lightweight, and has high thermal resistance. Also, the spacer may be manufactured, for example, by injection molding.

In accordance with another aspect of the present invention, there is provided a battery pack including the spacer with the above-stated construction.

The battery pack according to the present invention may be used in a medium- or large-sized battery system requiring a combination of two or more batteries. For example, the battery pack according to the present invention may be widely used in medium-sized devices, such as laptop computers, and large-sized devices, such as electric vehicles and hybrid electric vehicles.

Since the spacer according to the present invention can be cut into desired sizes as previously described, the battery pack according to the present invention may be flexibly manufactured depending upon the specifications (for example, the output and the capacity) of devices in which the battery pack is used.

The battery pack may be manufactured, for example, by attaching a plurality of cylindrical batteries, as unit cells, to a predetermined frame member while the cylindrical batteries are mounted to the opposite sides of the spacer. An example of the frame member is disclosed in Korean Patent Application No. 2005-0130423, which has been filed in the name of the applicant of the present patent application. The disclosure of the patent application is hereby incorporated by reference as if fully set forth herein.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
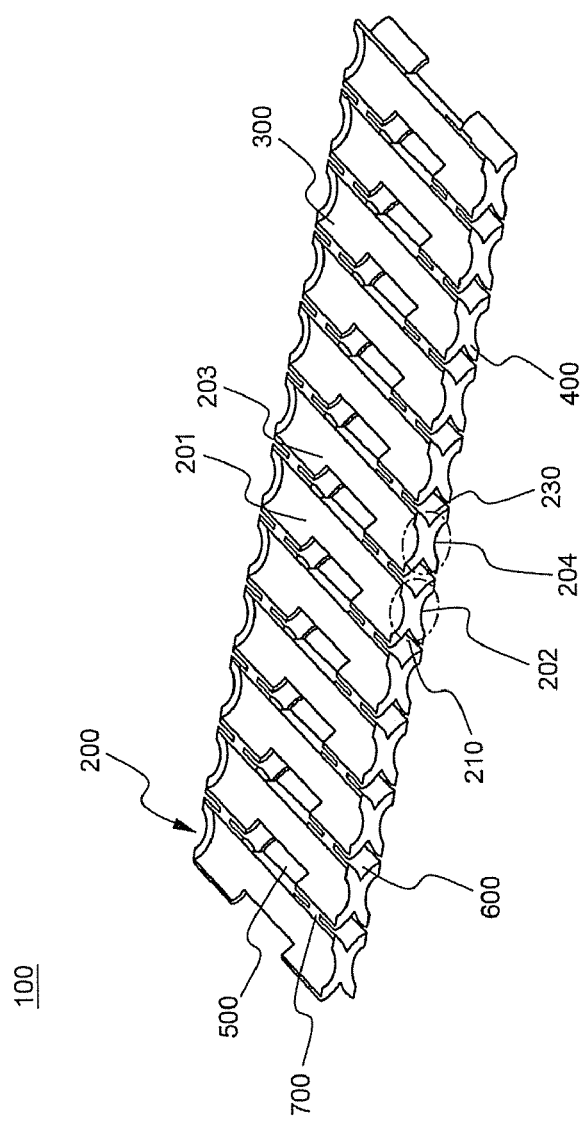
FIG. 1 is a perspective view illustrating a spacer for battery pack production according to a preferred embodiment of the present invention.

FIG. 1 is a perspective view illustrating a spacer for battery pack production according to a preferred embodiment of the present invention.

Referring to FIG. 1, a spacer for battery pack production 100 is constructed in the form of a rectangular frame. The spacer 100 is provided at opposite side surfaces thereof with battery receiving parts 201, 202, 203, and 204, which are formed in a circumferential structure corresponding to the outer surface of each cylindrical unit cell such that a plurality of cylindrical unit cells (not shown) can be received in the respective battery receiving parts 201, 202, 203, and 204. Here, the inner circumference of the battery receiving parts 201, 202, 203, and 204 has a size sufficient to partially cover the cylindrical unit cells.

At the upper and lower ends of the battery receiving parts 200 are formed skirts 300 and 400, respectively. The skirts 300 and 400 are constructed in a U-shaped plate structure extending along the semi-cylindrical circumference such that the upper and lower end surfaces of the unit cells are covered by the skirts 300 and 400, respectively. Consequently, the skirts 300 and 400 cover the upper and lower end surfaces of the unit cells so as to stably fix the unit cells. Because the skirts 300 and 400 are constructed in the U-shaped structure, however, electrode terminals of the unit cells are not covered by the skirts 300 and 400.

In the contact region of the two adjacent battery receiving parts 201 and 203 on the same plane of the frame is formed a horizontal through-hole 500, which extends in the thickness direction of the spacer 100. In the intersection region of the four adjacent battery receiving parts 201, 203, 203, and 204 on the same and opposite planes of the frame is formed a vertical through-channel 600, which extends in the longitudinal direction of the spacer 100.

Figure 2:
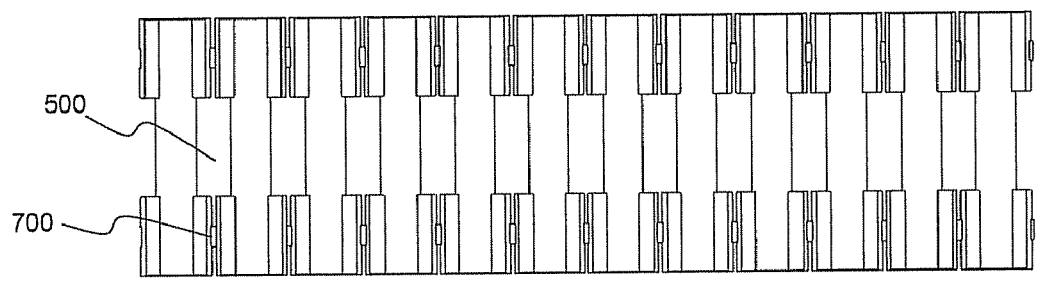
FIG. 2 is a plan view illustrating the spacer for battery pack production shown in FIG. 1.
Figure 3:
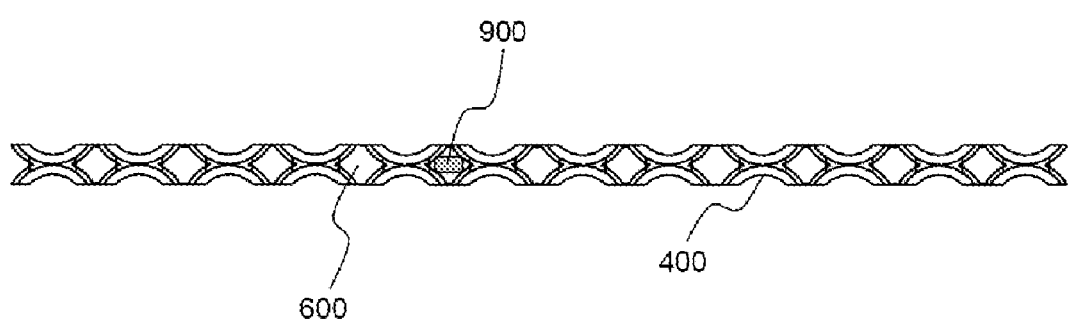
FIG. 3 is a front view illustrating the spacer for battery pack production shown in FIG. 1.

The horizontal through-hole 500 and the vertical through-channel 600 serve as a flow channel for a coolant, such as air. Especially, the vertical through-channel 600 is used as a space for mounting a thermistor 900. The thermistor is mounted in the region where the horizontal through-hole 500 and the vertical through-channel 600 communicate with each other, whereby the accuracy of the temperature measurement of the unit cells is increased. The structure of the horizontal through-hole 500 and the vertical through-channel 600 is shown in more detail in FIGS. 2 and 3, which are a plan view and a front view of the spacer 100.

Figure 4:
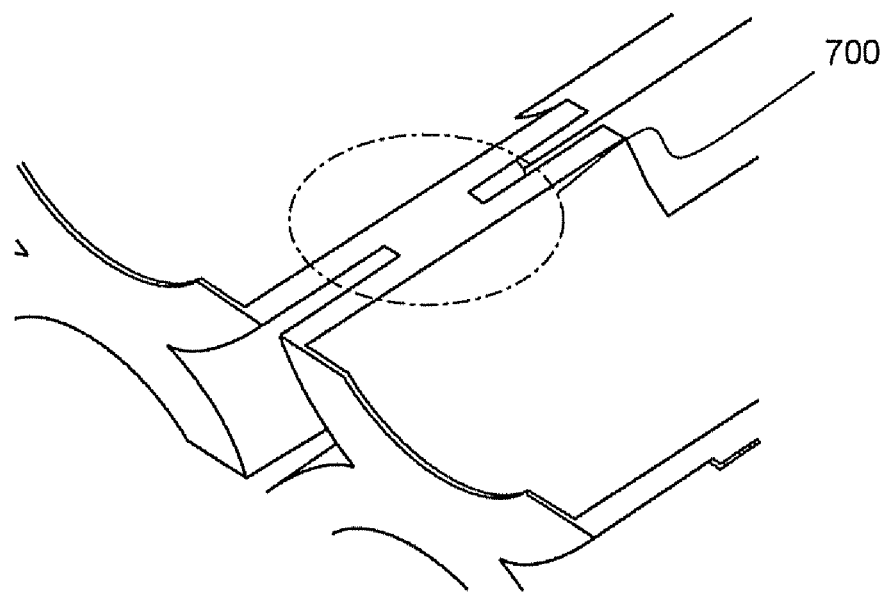
FIG. 4 is an enlarged perspective view illustrating the connection structure between unit receiving parts of the spacer shown in FIG. 1.
Figure 5:
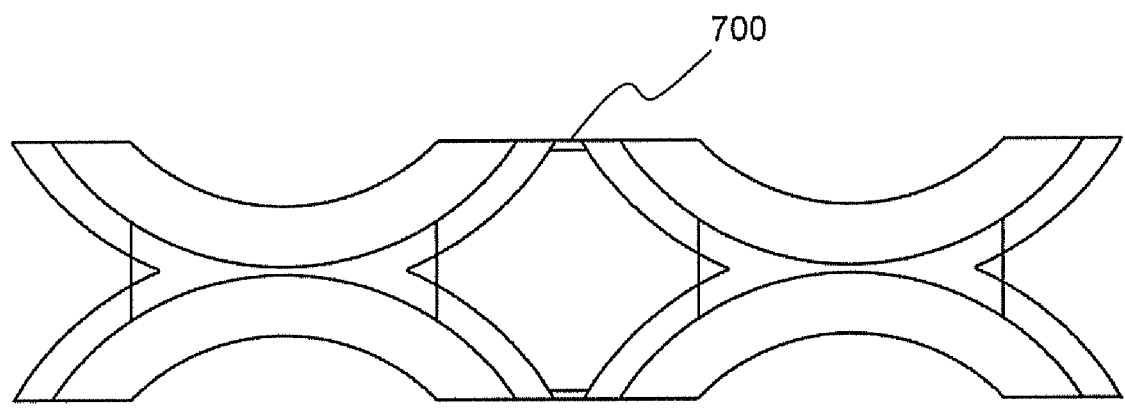
FIG. 5 is a front view of FIG. 4.

The two battery receiving parts 201 and 202 formed at the opposite side surfaces of the frame constitute a unit receiving part 210. The respective unit receiving parts 210 and 230 are connected with each other via gate structures 700, which are constructed to be easily cut. Each gate structure 700 is a plate-shaped structure having small thickness and small width. The gate structures 700 are formed at the upper and lower parts of the unit receiving part 210, which are separated from each other in the middle part of the unit receiving part 210. One unit receiving part 210 comprises the two battery receiving parts 201 and 202. Consequently, the number of the gate structures connecting the two unit receiving parts 210 and 230 is 4. The gate structures 700 are shown in more detail in FIG. 4, which is a partially enlarged view, and FIG. 5, which is a front view of FIG. 4.

Figure 6:
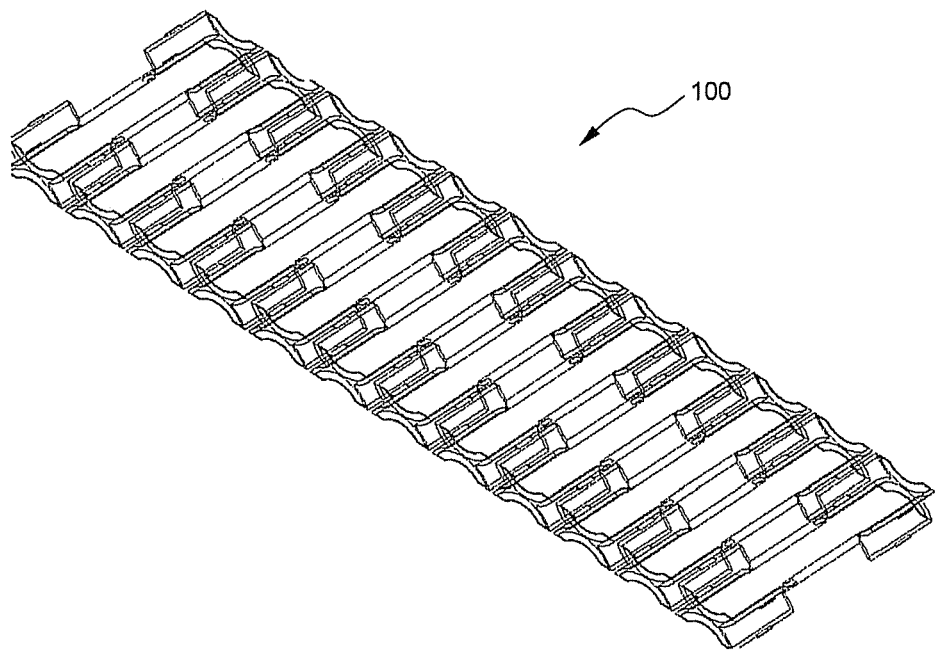
FIG. 6 is a see-through view illustrating the spacer for battery pack production shown in FIG. 1.

In addition, the overall structure of the spacer 100 is shown in more detail in FIG. 6, which is a see-through view of the spacer 100.

Figure 7:
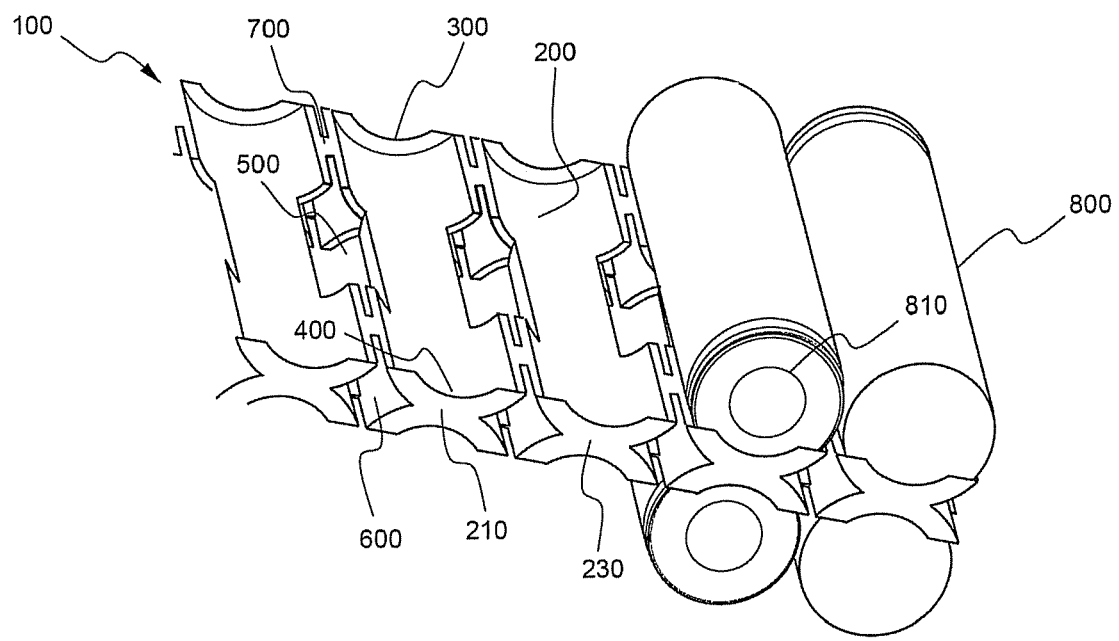
FIG. 7 is a perspective view illustrating cylindrical secondary batteries mounted to the spacer shown in FIG. 1.

FIG. 7 is a perspective view illustrating a battery pack constructed by mounting cylindrical secondary batteries to the spacer shown in FIG. 1.

Referring to FIG. 7, unit cells 800 and 801 are mounted side by side at the opposite side surfaces of the spacer 100. The skirts 300 and 400 formed at the upper and lower ends of the respective battery receiving parts 200 partially cover the upper and lower end surfaces of the unit cell 800 so as to assist to stably mount the unit cells 800. On the other hand, the skirts 300 and 400 cover the outer circumference surface of the unit cell 800. As a result, electrode terminals 810 of the unit cell 800 are exposed to the outside, and therefore, the electrical connection between the unit cells can be easily performed.

In spite of the above-described mounting structure, a large portion of the cylindrical battery 800 is exposed through the horizontal through-hole 500. Consequently, air flows through the exposed space, and therefore, it is possible to easily remove heat generated from the unit cells 800 and 801 during the charge and discharge of the unit cells. Also, the thermistor (not shown) is mounted at the region where the horizontal through-hole 500 and the vertical through-channel 600 communicate with each other. Consequently, it is possible to measure the temperature of the four adjacent unit cells 800 using one thermistor.

The connection regions of the unit receiving parts 210 and 230 are constructed in the gate structure that can be easily cut. Consequently, it is possible to manufacture a battery pack having various outputs and capacities using the spacer 100.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the spacer according to the present invention has the effect of allowing the production of a structurally stable battery pack using the minimized number of parts, reducing the number of processes, thereby lowering the costs of products, and preventing the occurrence of short circuits between unit cells during the assembly or the use of the battery pack. In addition, the spacer according to the present invention can be cut into various appropriate sizes, as occasion demands. Consequently, the spacer according to the present invention has the effect of easily adjusting the capacity and output of a battery pack and effectively removing heat generated from unit cells during the charge and discharge of the unit cells.

What is claimed is:

1. A spacer for production of a battery pack using cylindrical batteries as unit cells, wherein the spacer is constructed in the form of a rectangular frame, the spacer is provided at opposite side surfaces (opposite faces) of the rectangular frame with a plurality of battery receiving parts having a circumferential inner surface structure that partially covers the outer surfaces of the cylindrical batteries, each battery receiving part has a horizontal through-hole, which extends between the opposite side surfaces of the frame, and a pair of battery receiving parts (a unit receiving part) formed at the opposite side surfaces of the frame is connected with another adjacent unit receiving part via structures that can be easily cut compared to the other regions, wherein the battery receiving parts are provided at upper and lower ends thereof with skirts to partially cover the end surfaces of the unit cells;

the horizontal through-hole may be formed through the frame at the opposite-side middle parts of each battery receiving part such that the horizontal through-hole extends perpendicular to the longitudinal direction of the unit cells; and the connection regions of the unit receiving parts are constructed in a gate structure having small width and small thickness compared to the other regions.

2. The spacer according to claim 1, wherein the skirts protrude in a structure to cover the upper and lower end surfaces of the unit cells along the outer circumferential shape of the unit cells when the unit cells are received in the battery receiving parts.

3. The spacer according to claim 1, wherein the battery receiving parts are formed in a structure to partially cover the outer surfaces of the unit cells to not more than 50% of the height of the unit cells.

4. The spacer according to claim 1, wherein the horizontal through-hole is provided at the upper and lower ends thereof with gate structures to interconnect the respective unit receiving parts.

5. The spacer according to claim 1, wherein the spacer has a vertical through-channel formed in the intersection region of four adjacent battery receiving parts of the unit receiving parts, wherein the vertical through-channel is a vacant space formed between four circles when the four circles are arranged such that centers of the circles are positioned at respective corners of an imaginary square and the circumference of each circle touches the circumferences of the circles positioned at neighboring corners of the square.

6. The spacer according to claim 5, wherein the spacer has a thermistor mounted in the vertical through-channel for measuring the temperature of the unit cells.

7. The spacer according to claim 6, wherein the vertical through-channel communicates with the horizontal through-hole, and the thermistor is located in the communication region of the vertical through-channel and the horizontal through-hole.

8. A battery pack including the spacer according to claim 1.

* * * * *